United States Patent
Aoki et al.

[11] Patent Number: 5,954,120
[45] Date of Patent: Sep. 21, 1999

[54] HEATING APPARATUS FOR VEHICLE, HAVING HEAT GENERATING UNIT

[75] Inventors: Shinji Aoki, Kariya; Toshio Morikawa, Toyota; Hajime Ito, Kariya; Yasushi Kato; Goro Uchida, both of Toyota, all of Japan

[73] Assignees: Denso Corporation, Kariya; Toyota Jidosha Kabushiki Kaisha, Tokyo, both of Japan

[21] Appl. No.: 08/935,179

[22] Filed: Sep. 22, 1997

[30] Foreign Application Priority Data

Sep. 30, 1996 [JP] Japan .................... 8-258421

[51] Int. Cl.⁶ .............. B60H 3/00; F25B 1/00; F24C 9/00; G05D 23/00
[52] U.S. Cl. ............ 165/43; 237/123 B; 237/2 A; 126/247; 62/115; 165/202
[58] Field of Search ............ 237/12.3 B, 12.3 R, 237/2 A; 122/26; 126/247; 123/145 R; 62/115; 165/43, 202

[56] References Cited

U.S. PATENT DOCUMENTS

| | | | |
|---|---|---|---|
| 4,561,260 | 12/1985 | Nishi ............................ | 62/115 |
| 4,733,635 | 3/1988 | Menard et al. . | |
| 4,898,005 | 2/1990 | Sakurai ......................... | 62/115 |
| 4,993,377 | 2/1991 | Itakura . | |
| 5,009,074 | 4/1991 | Goubeaux .................... | 62/115 |
| 5,197,298 | 3/1993 | Kobayashi et al. ........... | 62/115 |
| 5,501,267 | 3/1996 | Iritani et al. .................. | 165/29 |

FOREIGN PATENT DOCUMENTS

| | | |
|---|---|---|
| A-3-57877 | 3/1991 | Japan . |
| A-6-92134 | 4/1994 | Japan . |

OTHER PUBLICATIONS

U.S. application No. 08/862,866, Aoki et al., filed May 23, 1997.
U.S. application No. 08/886,667, Aoki et al., filed Jul. 1, 1997.
U.S. application No. 08/892,411, Ito et al., filed Jul. 14, 1997.
U.S. application No. 08/898,536, Aoki et al., filed Jul. 22, 1996.
U.S. application No. 08/901,370, Ito, filed Jul. 28, 1997.
U.S. application No. 08/915,155, Aoki et al., filed Aug. 20, 1997.
U.S. application 08/933,295, Inoue et al., filed Sep. 18, 1997.
U.S. application No. 08/937,050, Aoki et al., filed Sep. 24, 1997.
U.S. application No. 08/936,257, Aoki et al., filed Sep. 24, 1997.
U.S. application No. 08/937,049, Aoki et al., filed Sep. 24, 1997.

*Primary Examiner*—Ira S. Lazarus
*Assistant Examiner*—Lance Chandler
*Attorney, Agent, or Firm*—Harness, Dickey & Pierce, PLC

[57] ABSTRACT

According to the present invention, when an air-conditioning clutch of a compressor is set on, even if an improvement of a heating capacity by a viscous heater is required, a viscous clutch is turned off not to transmit a rotational driving force of an engine to a rotor of the viscous heater, and further the rotational driving force of the engine is transmitted to the compressor. In this way, a torque applied to the engine E and the V-belt can be reduced, so that a fuel consumption ratio of the engine lowers and a fuel economical performance improves. Further, because an operation of the compressor is intermitted, it is possible to remove a fog of a front windshield, so that a safety of the vehicle travelling can be prevented from being deteriorated.

12 Claims, 8 Drawing Sheets

HEATING APPARATUS FOR VEHICLE, HAVING HEAT GENERATING UNIT

CROSS REFERENCE TO THE RELATED APPLICATION

This application is based on and claims priority of Japanese Patent Application of No. Hei. 8-258421 filed on Sep. 30, 1996, the content of which is incorporated herein by reference.

BACKGROUND OF THE INVENTION

1. Field of the Invention

The present invention relates to a heating apparatus provided with a heat-generating unit using a shearing force, for increasing a temperature of cooling water for cooling a water-cooled engine.

2. Description of Related Art

Conventionally, as a heating apparatus for a vehicle, there has been generally known a hot water type heating apparatus for heating a passenger compartment, in which cooling water for cooling a water-cooled engine is supplied to a heater core disposed in a duct, and air heated while passing through the heater core is blown into the passenger compartment by a blower to heat the passenger compartment.

Recently, an improvement of an engine efficiency is highly demanded for an engine mounted on a vehicle; however, when the engine efficiency improves, heat loss decreases; and therefore, the cooling water for cooling the engine cannot be heated sufficiently. Further, in a case of a vehicle having a diesel engine or a lean burn engine, the heat amount generated by the engine is too small to heat the cooling water sufficiently. In the vehicle where the heat amount generated by the engine is small, a temperature of the cooling water in the cooling water circuit cannot be maintained at a predetermined temperature (e.g., 80° C.), there occurs a problem in that a heating capacity for the passenger compartment is insufficient.

To overcome such a problem, as disclosed in JP-A-2-246823 or JP-A-3-57877, there has been conventionally proposed a heating apparatus for a vehicle, in which a heat-generating unit using a shearing force, for heating cooling water supplied from the engine to the heater core is disposed in a cooling water circuit, and when a temperature of the cooling water in the cooling water circuit, detected by a cooling water temperature sensor, is lower than a set cooling water temperature, the heat-generating unit is operated to improve the heating capacity.

The heat-generating unit transmits a rotational driving force of the engine to a shaft through a belt transmitting mechanism and an electromagnetic clutch, a heat-generating chamber is formed in a housing, and a cooling water passage is formed at an outer periphery of the heat-generating chamber. Further, a rotor which rotates integrally with the shaft is disposed in the heat-generating chamber, and a shearing force generated by a rotation of the rotor is applied to viscous fluid such as silicon oil sealed in the heat-generating chamber to generate heat. The cooling water is heated by the generated heat. That is, the heating apparatus for a vehicle uses a rotational driving force (driving torque) applied to the rotor of the heat-generating unit as an auxiliary heat source for heating operation.

In the heating apparatus for a vehicle, provided with a heat-generating unit as described above, it may be conceived that, a refrigerant evaporator of a refrigeration cycle is accommodated in a duct at an upwind side of a heater core, air flowing in the duct is temporarily cooled by the refrigerant evaporator while a refrigerant compressor is operated, and then is re-heated by the heater core to prevent a front windshield of the vehicle from being frosted or clouded.

In winter season, to prevent the front windshield of the vehicle from being frosted or clouded, an electromagnetic clutch is turned on to operate the refrigerant compressor, and further, to improve the heating capacity, another electromagnetic clutch is turned on to operate the heat-generating unit. However, if both of the refrigerant compressor and the heat-generating unit are operated, a large torque is applied to the engine or the belt transmitting mechanism. Therefore, an engine stall may be caused due to a sudden increase of a torque applied to the engine, a fuel consumption ratio of the engine may be increased, and a running cost (fuel economical performance) may deteriorate.

Further, there occur problems that each portion of the heat-generating unit may receive a large shock, an abnormal noise (chattering noise) may be generated by a slip of a belt of the belt mechanism, a durability of each portion may deteriorate, or the like. To solve those problems, when the electromagnetic clutch is turned off to stop the operation of the refrigerant compressor, there occurs a problem that a defrosting performance of the front windshield lowers to deteriorate a safety of the vehicle travelling.

SUMMARY OF THE INVENTION

It is an object of the present invention to provide a heating apparatus for a vehicle, capable of suppressing the noise from being generated due to a slip of a driving force transmitting means and for suppressing a durability of each portion of the heat-generating portion from being deteriorated, by reducing a stress applied to a driving source and the driving force transmitting means.

According to the present invention, when a rotating body of a refrigerant compressor is rotated by a driving source, a driving force transmitting unit is controlled to stop a rotation of a rotor of a heat-generating unit. Accordingly, the rotational driving force of the driving source is transmitted to the rotating body of the refrigerant compressor through the driving force transmitting unit, and further, the rotational driving force of the driving source is not transmitted to the rotor of the heat-generating unit through the driving force transmitting unit.

In this way, because a torque applied to the driving source and the driving force transmitting unit can be reduced, an energy efficiency of the driving source can be improved. A shock to be received by each portion of the heat-generating unit can be slackened, so that a deterioration of a durability of each portion of the heat-generating unit and a noise of the driving force transmitting unit can be suppressed. Further, because an operation of the compressor is intermitted, the air cooled and dehumidified in the refrigerant evaporator, which has a low-humidity, can be blown through an air outlet of a duct toward a passenger compartment. In this way, it is possible to prevent a generation of a fog on a front windshield, so that a safety of the vehicle travelling can be prevented from being deteriorated.

BRIEF DESCRIPTION OF THE ACCOMPANYING DRAWINGS

Additional objects and advantages of the present invention will be more readily apparent from the following detailed description of preferred embodiments thereof when taken together with the accompanying drawings in which.

DETAILED DESCRIPTION OF THE PREFERRED EMBODIMENTS

Figure 1:
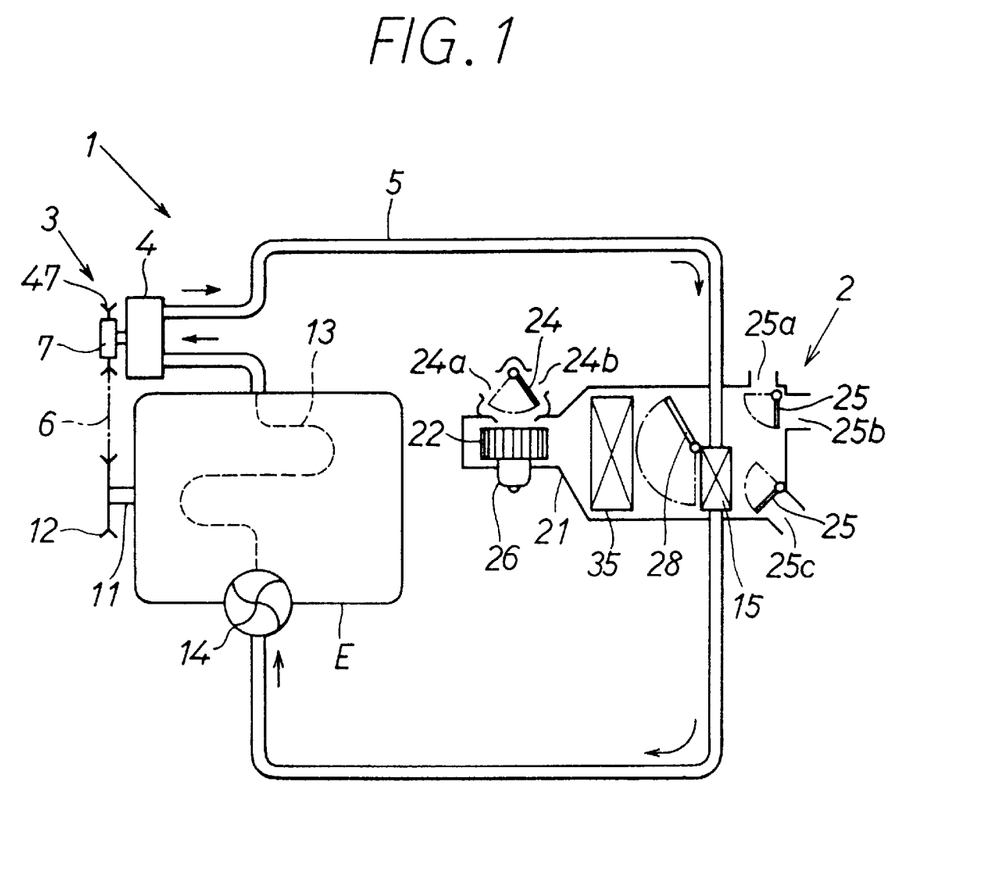
FIG. 1 is a schematic view showing an entire structure of an air conditioning apparatus for a vehicle, according to a first embodiment of the present invention.
Figure 2:
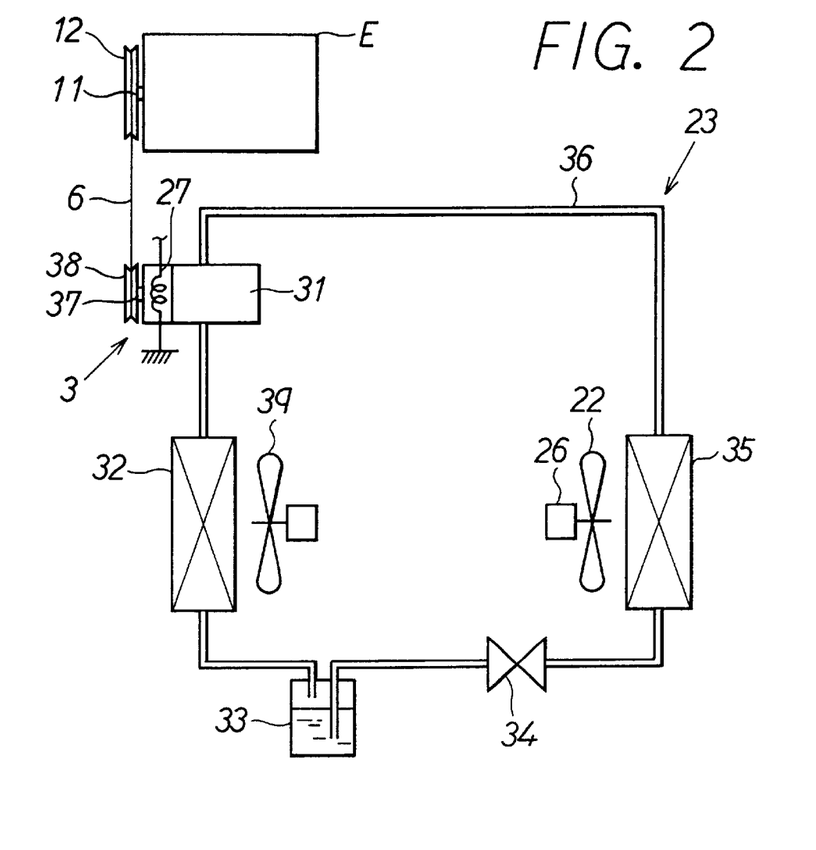
FIG. 2 is a schematic view showing a refrigeration cycle in the first embodiment.
Figure 3:
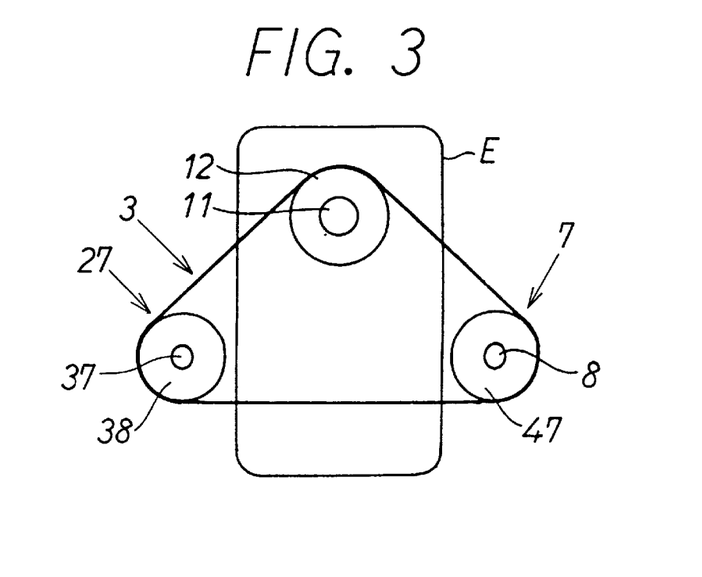
FIG. 3 is a schematic view showing an engine and a driving force transmitting apparatus in the first embodiment.

FIGS. 1 to 9 show a first embodiment of the present invention. FIG. 1 shows an entire structure of an air conditioning apparatus for a vehicle, FIG. 2 shows a refrigeration cycle, and FIG. 3 shows an engine and a belt transmitting mechanism.

An air conditioning apparatus 1 for a vehicle is equipped with a water-cooled diesel engine E (hereinafter simply referred to as "engine") disposed in an engine compartment of a vehicle, an air conditioning unit (hereinafter referred to as "A/C unit") 2 for air-conditioning a passenger compartment, a driving force transmitting apparatus 3 for transmitting a rotational driving force of the engine E, a heat-generating unit 4 (hereinafter referred to as "viscous heater") using a shearing force, for heating cooling water for cooling the engine E, an air-conditioning ECU 100 (hereinafter referred to as "A/C ECU") for controlling the A/C unit 2, a viscous ECU 200 for controlling the viscous heater 4, an engine ECU 300 (hereinafter referred to as "E/G ECU") for controlling the engine E, and the like.

The engine E is a driving source for driving the viscous heater 4 as well as a heat source apparatus for heating operation, and is a water-cooled internal combustion engine for rotating a compressor (described later) and the viscous heater 4. Further, a crank pulley 12 is attached to an output shaft (crankshaft) 11 of the engine E.

The engine E is provided with a water jacket 13 around a cylinder block and a cylinder head. The water jacket 13 is disposed in a cooling water circuit 5 through which the cooling water circulates.

In the cooling water circuit 5, there is disposed a water pump 14 for compulsorily pumping the cooling water, a radiator (not shown) for cooling the cooling water by heat-exchanging the cooling water and air, a heater core 15 for heating air by heat-exchanging the cooling water and air, and the like. The water pump 14 is disposed at an upstream side of the water jacket 13 of the engine E and is rotated by the crankshaft 11 of the engine E.

The A/C unit 2 is constructed by a duct 21, a blower 22, a refrigeration cycle 23, the heater core 15, and the like. At an upwind side of the duct 21, there is rotatably provided an inside air/outside air switching damper 24 for selectively opening and closing an outside air inlet 24a and an inside air inlet 24b to switch an air inlet mode.

At a downwind side of the duct 21, there is rotatably provided a mode switching damper 25 for selectively opening and closing a defroster air outlet (an air outlet of the present invention) 25a, a face air outlet 25b, and a foot air outlet 25c to switch an air outlet mode. The blower 22 is blower means (centrifugal blower) rotated by a blower motor 26 to generate an air flow toward the passenger compartment in the duct 21.

The heater core 15 is a heating heat exchanger, is disposed within the front duct 21 at a downstream side (downwind side) of an evaporator 35 with reference to the air flow direction and is connected to the cooling water circuit 5 at a downstream side of the heat-generating unit 4 with reference to the flow direction of the cooling water. The heater core 15 is heating means for heating air by heat-exchanging the air having passed through the evaporator 35 and the cooling water.

At an upwind side of the heater core 15, there is rotatably provided an air-mixing damper 28. The air-mixing damper 28 adjusts a ratio between an amount of air (warm air) passing through the heater core 15 and an amount of air (cool air) bypassing the heater core 15 so that a temperature of air blown out into the passenger compartment can be adjusted. The air mixing damper 28 is actuated by an actuator (damper actuating means) such as a servomotor 29 through one or plural link plate(s).

The refrigeration cycle is composed of the compressor (refrigerant compressor) 31, a condenser (refrigerant condenser) 32, a receiver (gas-liquid separator) 33, an expansion valve (decompressing device) 34, the evaporator (refrigerant evaporator) 35, a refrigerant pipe 36 for circularly connecting these components, and the like. The compressor 31 has a shaft 37 as a rotating body, and when a rotational driving force of the engine E is transmitted to the shaft 37, the compressor 31 compresses the refrigerant sucked from the evaporator 35 and discharges the refrigerant toward the condenser 32. The reference numeral 39 indicates a condenser fan. The evaporator 35 is disposed in the duct 21 and is cooling means for cooling air flowing in the duct 21.

The driving force transmitting apparatus 3 includes, as shown in FIGS. 1 and 2, a multi-stage type V-belt 6 hung on a crank pulley 12 attached to the crankshaft 11 of the engine E, an electromagnetic clutch 27 (hereinafter referred to as "A/C clutch") of the compressor 31, on which the V-belt 6 is hung, an electromagnetic clutch (hereinafter referred to as "viscous clutch") 7, on which the V-belt 6 is hung with the A/C clutch 27, and the like.

The V-belt 6 is belt transmitting means for transmitting a rotational driving force (driving force) of the engine E to the shaft 37 of the compressor 31 and also for transmitting a rotational driving force (driving force) of the engine E to the shaft 8 of the viscous heater 4 through the viscous clutch 7.

The A/C clutch 27 is first clutch means of the present invention and has a V-pulley 38 driven by and connected to a crank pulley 12 (see FIG. 2) attached to the crankshaft 12 of the engine E through the V-belt 6.

When an electric current is supplied to an electromagnetic coil thereof or a supply of the electric current to the electromagnetic coil is stopped, an output portion (armature, inner hub) is attracted to or is separated from an input portion (rotor) so that a transmission of the rotational driving force from the engine E to the shaft 37 of the compressor 31 is intermitted.

Figure 4:
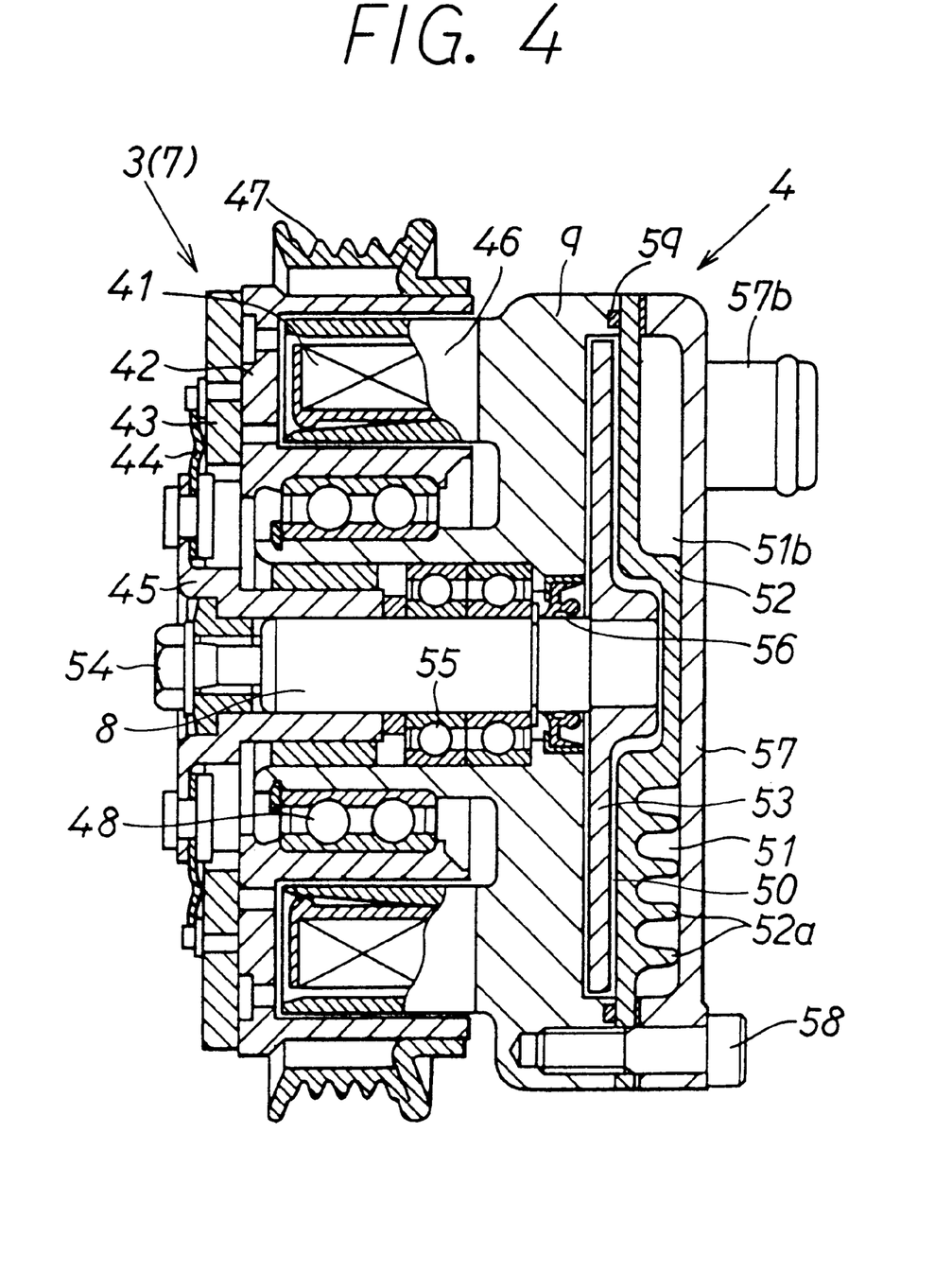
FIG. 4 is a cross sectional view showing a viscous clutch and a viscous heater in the first embodiment.

The viscous clutch 7 is second clutch means of the present invention, and constructed, as shown in FIG. 4, by an electromagnetic coil 41 for generating a magnetomotive force when being electrified, a rotor 42 rotated by the engine E, an armature 43 attracted toward the rotor 42 by the magnetomotive force, an inner hub 45 connected to the armature 43 with a plate spring 44 and supplying a rotational driving force to the shaft 8 of the viscous heater 4, and the like.

The electromagnetic coil 41 is structured by winding a conductive lead wire covered with an insulating material. The electromagnetic coil 41 is disposed in the stator 46 and is fixedly molded in the stator 46 with an epoxy resin. The stator 46 is fixed on a front surface of a housing 10 of the viscous heater 4.

A V-pulley 47 (see FIGS. 1 and 3) hanging the V-belt 6 on an outer periphery thereof is joined to the rotor 42 by joining means such as welding and is a rotating body (input portion of the viscous clutch 7) which always rotates by a rotational driving force of the engine E, transmitted thereto through the V-belt 6. The rotor 42 is a first friction member formed of magnetic material to have a U-shaped cross section, and is rotatably supported on an outer periphery of the housing 9 of the viscous heater 4 with a bearing 48 disposed in an inner periphery thereof.

The armature 43 is a second friction member formed of magnetic material in a ring-shaped plate, and has a friction surface formed in a ring-shaped plate, which is opposed to a friction surface of the rotor 42 by an air gap (e.g., a clearance of 0.5 mm) in an axial direction. When the armature 43 is attracted to (engaged with) the friction surface of the rotor 42 by the electromotive force of the electromagnetic coil 41, the rotational driving force of the engine E is transmitted from the rotor 42 to the armature 43.

The plate spring 44 is fixed to the armature 43 at an outer peripheral side by fixing means such as a rivet and is fixed to the inner hub 45 at an inner peripheral side by fixing means such as a rivet. The plate spring 44 is an elastic member for displacing the armature 43 in a direction (the left direction in the drawing) as to be separated (released) from the friction surface of the rotor 42 when the supply of the electric current to the electromagnetic coil 41 is stopped, to return the armature 43 to an initial position thereof.

The inner hub 45 is an output portion of the viscous clutch 7 such that the input side thereof is connected to and driven by the armature 43 through the plate spring 44 and the output side is connected to and driven by the shaft 8 of the viscous heater 4 with a spline fitting connection.

Figure 5:
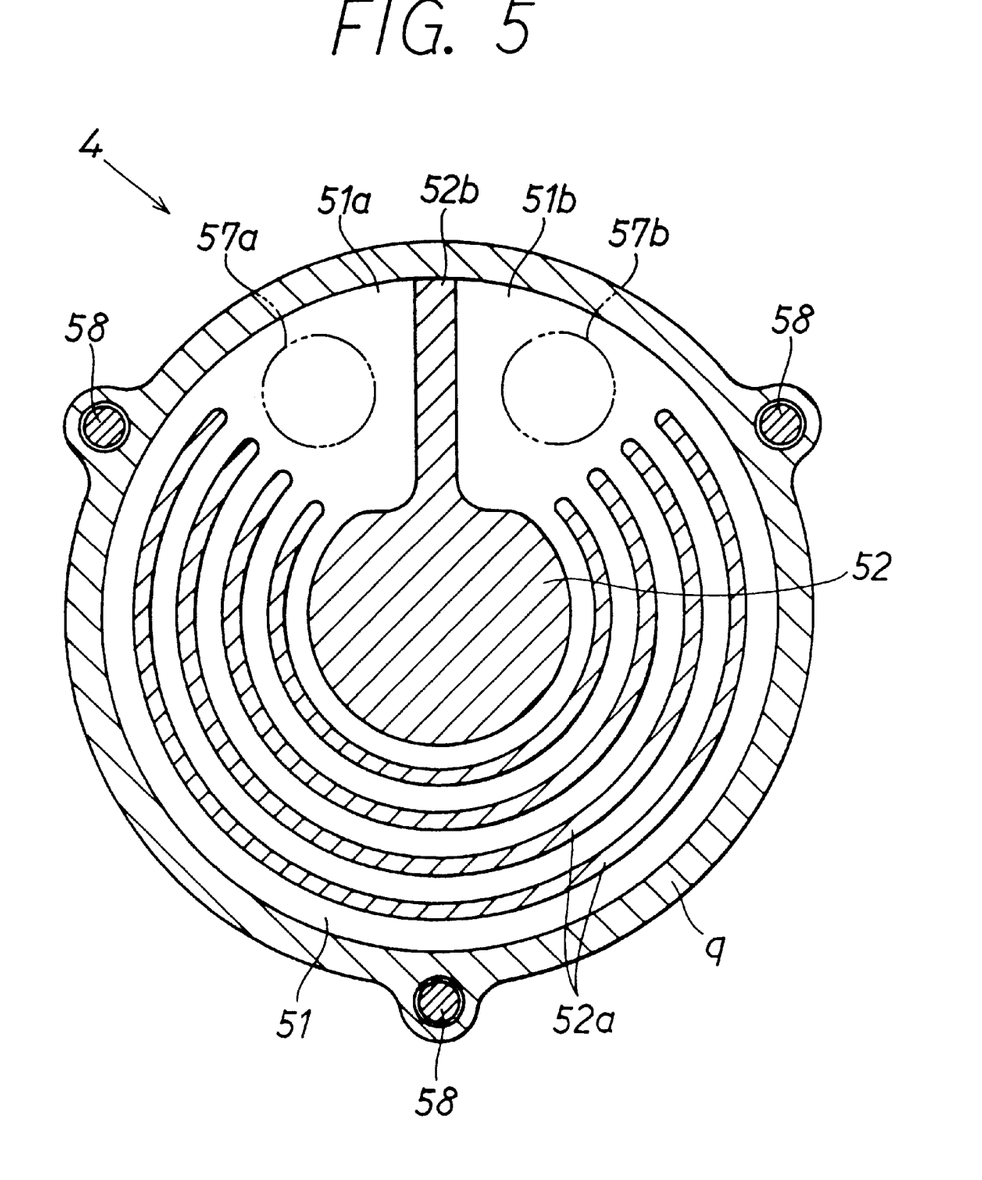
FIG. 5 is a cross sectional view showing the viscous heater in the first embodiment.

The viscous heater 4 is constructed, as shown in FIGS. 4 and 5, by the shaft 8 rotated by the engine E through the V-belt 6 and the viscous clutch 7, the housing 9 for rotatably supporting the shaft 8, a separator 52 for dividing an inner space of the housing 9 into a heat-generating chamber 50 and a cooling water passage 51, a rotor 53 rotatably disposed in the housing 9, and the like.

The shaft 8 is an input shaft which is fixedly fastened to the inner hub 45 of the viscous clutch 7 by fastening means 54 such as a bolt and rotates integrally with the armature 43. The shaft 8 is rotatably disposed in an inner periphery of the housing 9 with a bearing 55 and a sealing member 56. The sealing member 56 employs an oil-seal for preventing a leakage of the high-viscosity fluid.

The housing 9 is made of a metallic member such as aluminum alloy. A cover 57 formed in a ring-shaped plate is fixedly fastened to a rear end of the housing 9 by fastening means 58 such as a bolt. On a surface where the housing 9 and the cover 57 are joined, there are disposed the separator 52 and a sealing member 59. The sealing member 59 employs an oil-seal for preventing a leakage of high-viscosity fluid.

The separator 52 is a partition member which is made of a metallic member such as aluminum alloy, which is superior in heat conductivity. An outer peripheral portion of the separator 52 is sandwiched between a cylindrical portion of the housing 9 and a cylindrical portion of the cover 57. Between a front end surface of the separator 52 and a rear end surface of the separator 52, there is formed the heat-generating chamber 50 for sealing high-viscosity fluid (e.g., high-viscosity silicon oil) which generates heat when a shearing force is applied thereto.

Between a rear end surface and the cover 57, there is formed the cooling water passage 51, which are liquid-tightly partitioned from the outside and in which the cooling water for cooling the engine E circulates. Further, on the rear end surface of the separator 52 at a lower side, there are integrally formed a plurality of fin portions 52a having a substantially arcuate shape, for transmitting heat of the high-viscosity fluid to the cooling water efficiently.

Instead of the fin portions 52a, the rear end surface of the separator 52 may be formed in a convex and concave shape, or a heat transmission facilitating member such as a corrugated fin and a fine pin fin may be provided on an inner wall surface of the cover 57. Further, between the separator 52 and the rotor 53, there may be formed a labyrinth seal as the heat-generating chamber 50.

A partition wall 52b for partitioning an upstream side water passage 51a and a downstream side water passage 51b are formed to protrude from the rear end surface of the separator 52. To an outer wall portion of the cover 57, which is adjacent to the partition wall 52b, there are connected an inlet side cooling water pipe 57a into which the cooling water flows and an outlet side cooling water pipe 57b through which the cooling water flows out.

The rotor 53 is rotatably disposed in the heat-generating chamber 50 and is fixed to an outer periphery of the rear end portion of the shaft 8. On an outer peripheral surface or both side wall surfaces of the rotor 53, there are formed a plurality of groove portions (not shown). Between the adjacent groove portions, there is formed a protrusion portion. When the rotational driving force of the engine E is supplied to the shaft 8, the rotor 53 rotates integrally with the shaft 8 to generate a shearing force to the high-viscosity fluid sealed in the heat-generating chamber 50.

Figure 6:
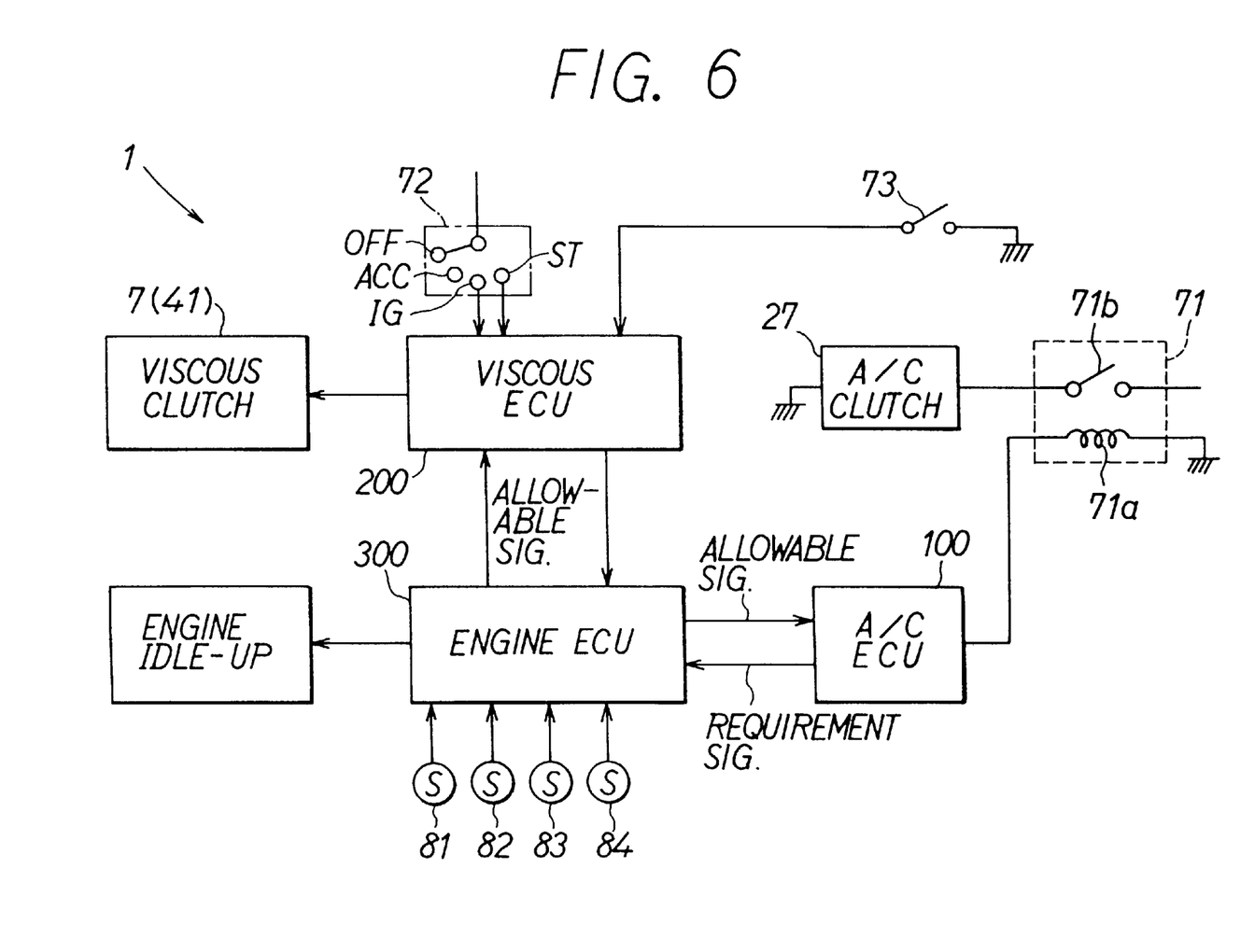
FIG. 6 is a block diagram showing an electric circuit of the air-conditioning apparatus for a vehicle in the first embodiment.

Next, an A/C ECU 100 will be described briefly with reference to FIGS. 1, 2, and 6. FIG. 6 shows an electric circuit of the air conditioning apparatus 1 for a vehicle.

The A/C ECU 100 is an electric circuit for an air-conditioning control system for performing a computer control for cooling and heating equipment such as the compressor of the A/C unit 2. The A/C ECU 100 itself is a microcomputer in which a CPU, a ROM, and a RAM are incorporated.

The A/C ECU 100 performs an air-conditioning control for the passenger compartment by controlling an cooling and heating equipment such as the blower 22, the air-mixing damper 28, and an air-conditioning clutch relay 71, based on input signals from the E/G ECU 300 and a pre-stored control program.

The air-conditioning clutch relay 71 is composed of a relay coil 71a and a relay switch 71b, and when an electric current is supplied to the relay coil 71a, the relay switch 71b is closed. In this way, an electric current is supplied to the electromagnetic coil of the A/C clutch 27.

Next, the viscous ECU 200 will be briefly described with reference to FIGS. 1, 2, 6, and 7.

The viscous ECU 200 is heating control means and is an electric circuit for an air-conditioning control system for performing a computer control for cooling and heating equipment such as the viscous heater 4. The viscous ECU 200 itself is a microcomputer in which a CPU, a ROM, and a RAM are incorporated.

The viscous ECU 200 performs an air-conditioning control for the passenger compartment by controlling the cooling and heating equipment such as the electromagnetic coil 41 of the viscous clutch 7, based on a connection between the relay switch 71b of the air-conditioning clutch relay 71 and the A/C clutch 27, input signals from an ignition switch 72, a viscous switch 73, and the E/G ECU 300, and a pre-stored control program.

The ignition switch 71 includes each terminal of OFF, ACC, ST and IG. The terminal of ST is a stator electric current supply terminal for supplying an electric current to a starter and outputs a stator electric current supply signal to the viscous ECU 200.

The viscous switch 73 is for preferring a heating operation for the passenger compartment by using the viscous heater 4. When the viscous switch 73 is turned on, a heating preference signal is output to the A/C ECU 100. The viscous switch 73 is an economical fuel consumption preference switch for giving an improvement of the fuel consumption rate (fuel economy) priority. When the viscous switch 73 is turned off, a fuel consumption preference signal is output to the viscous ECU 200.

Figure 7:
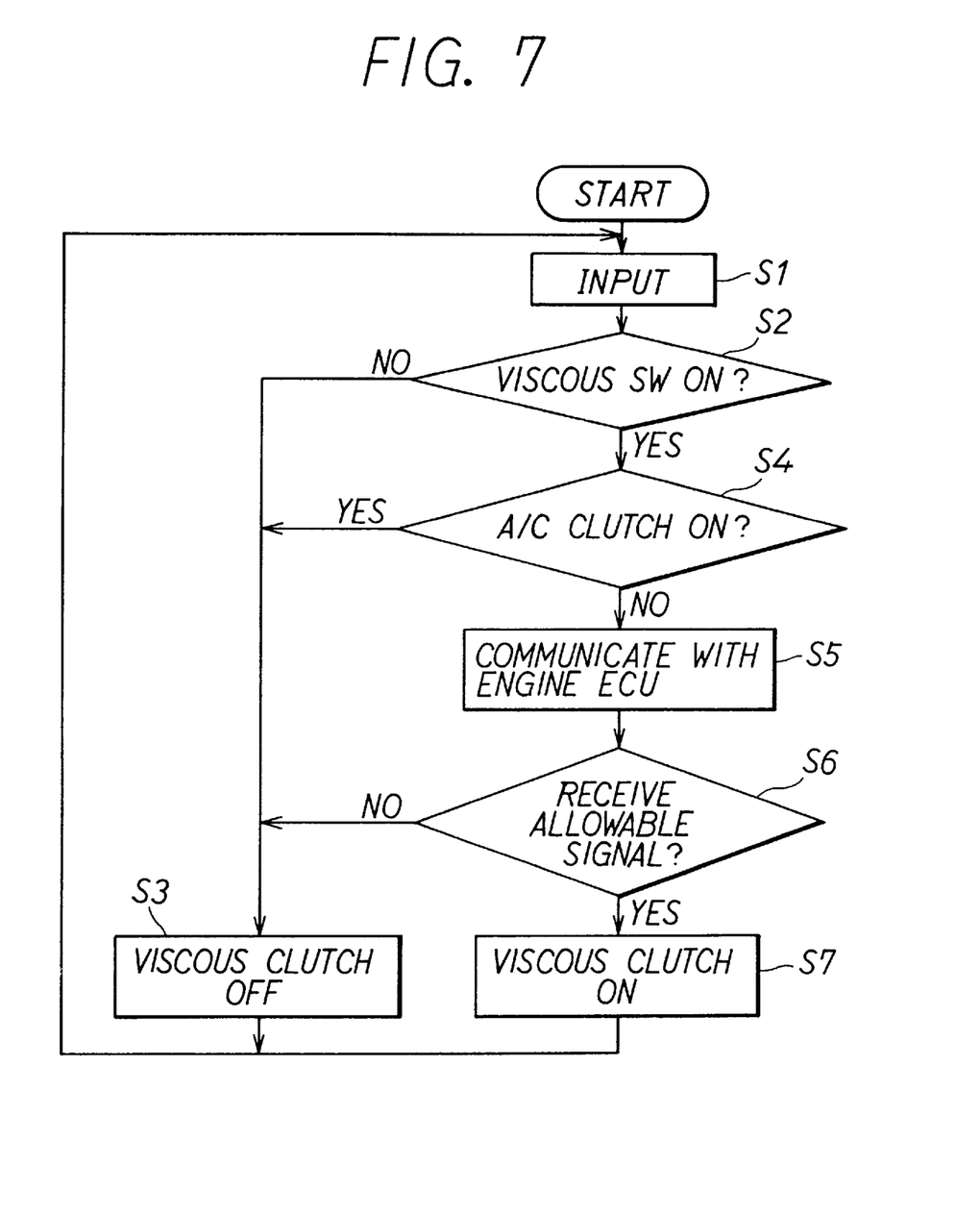
FIG. 7 is a flow chart of a control program of a viscous ECU in the first embodiment.

Next, a control of the viscous heater 4 of the viscous ECU 200 will be described with reference to FIGS. 1–7. FIG. 7 shows a flow chart of a control program of the viscous ECU 200.

Firstly, various kinds of sensor signals and switch signals are read (rotation detecting means: step S1).

Next, it is determined whether or not the viscous switch 73 is set on. That is, it is determined whether or not the heating preference signal or the economical fuel consumption preference switch is input (viscous switch determining means: step S2).

When the determination at step S2 is "NO", it is not necessary to heat the passenger compartment and a priority is given on the improvement of the fuel consumption rate of the engine E. Therefore, the electromagnetic coil 41 of the viscous clutch 7 is turned off, i.e., the supply of the electric current to the electromagnetic coil 41 is stopped, and the rotor 53 of the viscous heater 4 is stopped rotating (step S3). Next, it proceeds to a process at step S1.

On the other hand, when the determination at step S2 is "YES", it is determined whether the compressor 31 of the refrigeration cycle 23 is operating. That is, it is determined whether the electromagnetic coil of the A/C clutch 27 is set on by closing the relay switch 71b of the air-conditioning clutch relay 71 (rotation detecting means: step S4). When the determination is "YES", it proceeds to a process at step S3, and the electromagnetic coil 41 of the viscous clutch 7 is turned off.

Further, when the determination at step S4 is "NO", it performs a communication with (transmits a signal to and receives a signal from) the E/G ECU 300 (step S5). Next, it is determined whether an allowable signal for allowing the electromagnetic coil 41 of the viscous clutch 7 to be turned on is received from the E/G ECU 300 (allowable signal determining means: step S6). When the determination is "NO", it proceeds to the process at step S3, and the electromagnetic coil 41 of the viscous clutch 7 is turned off.

When the determination at step S6 is "YES", the electromagnetic coil 41 of the viscous clutch 7 is turned on to compensate an insufficiency of the heating capacity in the maximum heating operation, i.e., an electric current is supplied to the electromagnetic coil 41 of the viscous clutch 7 so that the rotor 53 of the viscous heater 9 is rotated (viscous heater actuating means: step S7). Next, it proceeds to the process at step S1.

Next, the E/G ECU 300 will be briefly described with reference to FIGS. 1, 6, 8 and 9.

The E/G ECU 300 is heating control means of the present invention and is an electric circuit for an engine control system for performing a computer control of the engine E. The E/G ECU 300 is a microcomputer in which a CPU, a ROM, and a RAM are incorporated.

Figure 8:
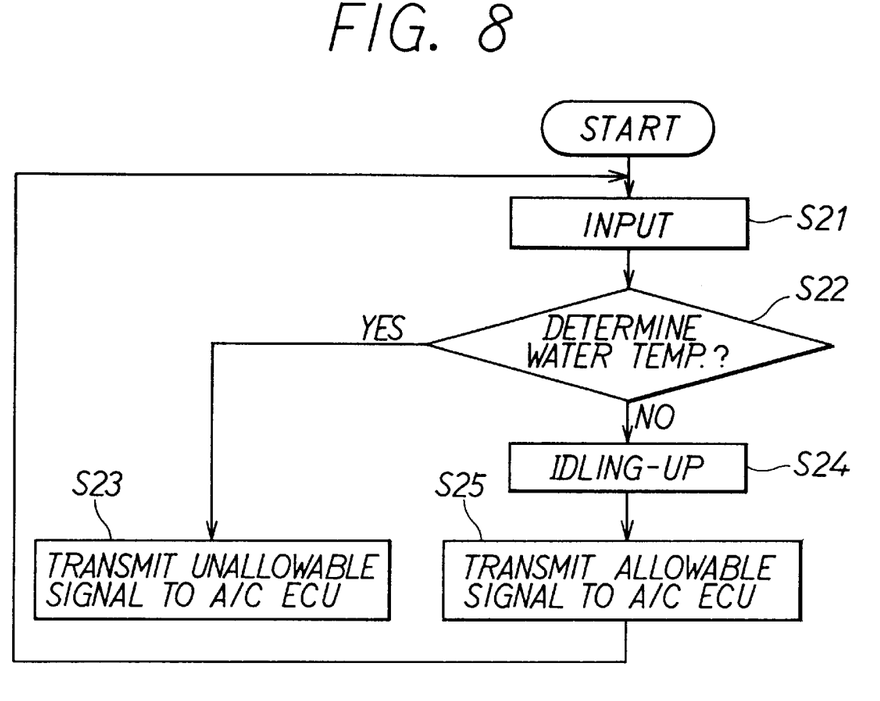
FIG. 8 is a flow chart of a control program of an engine ECU in the first embodiment.

The E/G ECU 300 controls an engine control of an idling rotational speed control (idle-up control) of the engine E, a fuel injection amount, a fuel injection timing, an intake air throttle, a supply of electric current to a glow plug, and the like, based on signals input from an engine rotational speed sensor 81, a vehicle speed sensor 82, a throttle opening sensor 83, and the viscous ECU 200, and the pre-stored control program (see FIG. 8). The E/G ECU 300 also transmits signals required for processes of the viscous ECU 200 to the viscous ECU 200.

The engine rotational speed sensor 81 corresponds to engine rotational speed detecting means for detecting a rotational speed of the crankshaft 11 of the engine E, relative to the rotor 53 of the viscous heater 4, and outputs an engine rotational speed signal to the E/G ECU 300.

The vehicle speed sensor 82 employs, for example, a reed switch type vehicle speed sensor, a photo-electric switch type speed sensor, or a MRE (Magnetic Resistance Element) type vehicle sensor. The vehicle speed sensor 82 is vehicle speed detecting means for detecting a speed of the vehicle and outputs a vehicle speed signal to the E/G ECU 300.

The throttle opening sensor 83 is throttle opening degree detecting means for detecting an opening degree of the throttle valve disposed in an intake pipe of the engine E and outputs a throttle opening signal to the E/G ECU 300.

A cooling water temperature sensor 84 employs, for example, a thermistor. The cooling water temperature sensor 84 is cooling water temperature detecting means for detecting a temperature of the cooling water in the cooling water circuit 5 (in this embodiment, a temperature of the cooling water in the outlet side cooling water pipe 57b of the cooling water passage 51 of the viscous heater 4), and outputs a cooling water temperature detection signal to the E/G ECU 300.

Next, a viscous heater control of the E/G ECU 300 will be briefly described with reference to FIGS. 1, 6, 8 and 9. FIG. 8 shows a flow chart of a control program of the E/G ECU 300.

Firstly, various kinds of sensor signals and switch signals are input (vehicle speed detecting means, throttle opening degree detecting means, engine rotational speed detecting means, cooling water temperature detecting means: step S21).

It is determined whether the electromagnetic coil 41 of the viscous clutch 7 is set on or off according to a characteristics graph (see FIG. 9) of the viscous heater control based on the cooling water temperature, pre-stored in a memory circuit (for example, ROM). That is, it is determined whether or not the cooling water temperature detected by the cooling water temperature sensor 84 is higher or lower than the set cooling water temperature (set value) (cooling water temperature detecting means : step S22).

Figure 9:
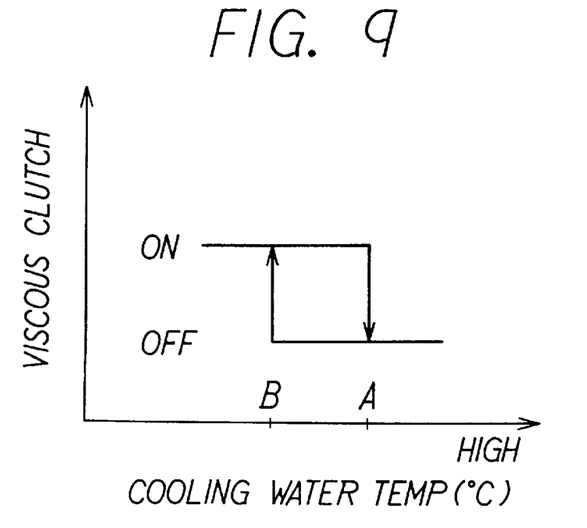
FIG. 9 is a characteristic graph of the engine ECU, showing a viscous heater control based on a temperature of cooling water in the first embodiment.

More specifically, as shown in the characteristics graph of FIG. 9, a hysteresis is given between a set cooling water temperature (A: 80° C., for example) and another set cooling water temperature (B: 70° C., for example). When the temperature of the cooling water is equal to or higher than the set cooling water temperature, i.e., the temperature of the cooling water is high, the electromagnetic coil 41 is turned off, whereas when the temperature of the cooling water is equal to or lower than the set cooling water, i.e., the temperature of the cooling water is low, the electromagnetic coil 41 is turned on. The hysteresis is given to the characteristics graph of FIG. 9; however, the hysteresis may not be given.

When the determination at step S22 is "the high temperature", an unallowable signal for not allowing the electromagnetic clutch 41 of the viscous clutch 7 to be turned on is transmitted to the viscous ECU 200 (unallowable signal transmitting means: step S23). Next, it proceeds to a process at step S11. The process at step S23 may be omitted.

If the determination at step S22 is "the low temperature", when electric loads of the A/C unit 2 and a load of a power steering unit are applied to the engine E while the engine is idling, an amount of intake air is increased to perform a control for increasing the idling rotational speed stepwise, so-called idle-up control (step S14).

When a predetermined time (e.g., 0.5 sec.) has passed since the idle-up control is performed at step S24, an allowable signal for allowing the electromagnetic clutch 41 of the viscous clutch 7 to be turned on is transmitted to the viscous ECU 200 (allowable signal transmitting means: step S25). Next, it proceeds to the process at step S21. Whether or not allowable signal for allowing the electromagnetic clutch 41 of the viscous clutch 7 to be turned on is transmitted to the viscous ECU 200 may be determined based on sensor signals from the engine rotational speed sensor 81, the vehicle speed sensor 82, the throttle opening sensor 83, and the like.

Next, an operation of the air-conditioning apparatus 1 according to the embodiment will be briefly described with reference to FIGS. 1–9.

In winter season, the refrigeration cycle 23 is started to prevent the front windshield from being frosted, and further the viscous heater 4 should be operated by turning on the viscous switch 73 to improve the heating capacity for heating the passenger compartment.

In this case, when the engine E starts, the crankshaft 11 rotates, and the rotational driving force of the engine E is transmitted to the rotor 42 through the V-belt 6 of the belt transmitting mechanism 3; however, even if the other conditions where the viscous heater 4 is used are satisfied, when the electromagnetic coil of the A/C clutch 27 of the compressor 31 is set on, the electromagnetic coil 41 of the viscous clutch 7 is turned off. Therefore, the armature 43 is not attracted to the friction surface of the rotor 42, and the rotational driving force of the engine E is not transmitted to the inner hub 45 and the shaft 8. In this way, the rotor 42 races simply, and the shaft 8 and the rotor 53 do not rotate. Therefore, a large torque is not applied to the engine E, the V-belt 6, and the viscous clutch 7.

In this way, because the rotational driving force of the crankshaft 11 of the engine E continues to be transmitted to the A/C clutch 27 of the compressor 31, warm air cooled and dehumidified in the evaporator 35 and then re-heated by the heater core 15, which has a low humidity, is blown out toward an inner surface of the front windshield from a defroster air outlet (air outlet of the present invention) 25a of the duct 21. Therefore, it is possible to remove a fog on an inner surface of the front windshield and a frost on an outer surface of the front windshield.

When the engine E starts, the crankshaft 11 rotates, and the rotational driving force of the engine E is transmitted to the rotor 42 through the V-belt 6 of the belt transmitting mechanism 3. When the viscous switch 73 is turned on, in a case where the cooling water temperature is lower than the set cooling water temperature (set value) and the allowable signal is received from the E/G ECU 300, the electromagnetic coil 41 of the viscous clutch 7 is turned on. That is, when the engine rotational speed is lower than the set engine rotational speed, the electromagnetic coil 41 is turned on, the armature 43 is attracted to the friction surface of the rotor 42 with magnetomotive force of the electromagnetic coil 41 to transmit the rotational driving force of the engine E to the inner hub 45 and the shaft 8.

In this way, since the rotor 53 rotates integrally with the shaft 8, a shearing force is applied to the high-viscosity fluid in the heat-generating chamber 50 to generate heat. Therefore, when the cooling water heated in the water jacket 13 of the engine E passes through the cooling water passage 51, the cooling water is heated while absorbing heat generated by the high-viscosity fluid through the fin portion 52a. The cooling water heated by the viscous heater 4 is supplied to the front heater core 15 so that the heating operation of the passenger compartment is performed with a large heating capacity.

As described above, in this embodiment, when the electromagnetic coil of the A/C clutch 27 is turned on to prevent the front windshield from being frosted, even if the viscous switch 73 is turned on to improve the heating capacity for the passenger compartment and further the temperature of the cooling water is lower than the set cooling water temperature, the electromagnetic coil 41 of the viscous clutch 7 is turned off. Or, even while the viscous heater 4 is operating to improve the heating capacity for the passenger compartment, when the electromagnetic coil of the A/C clutch 27 is turned on to remove a fog on an inner surface of the front windshield and a frost on an outer surface of the front windshield, the electromagnetic coil 41 of the viscous clutch 7 is turned off. In this way, because a torque applied to the engine E, the V-belt 6, and the viscous clutch 7 is reduced, the fuel consumption rate of the engine E can be lowered, and the fuel economical performance (running cost) can be improved.

Further, because a shock to be received by each portion of the viscous heater 4 (a connecting portion between the rotor 53 and the shaft 8, a connecting portion between the inner hub 45 and the shaft 8, and the rotor 53 itself) is slackened, a deterioration of a durability of each portion of the viscous heater 4 and a noise such as a belt chattering noise can be suppressed. Further, because an operation of the compressor 31 is intermitted, warm air having a low humidity can be blown toward an inner surface of the front windshield. In this way, it is possible to remove a fog on an inner surface of the front windshield and a frost on an outer surface of the front windshield, and there is no possibility that a safety of the vehicle travelling deteriorates.

In this embodiment, when all conditions where the viscous heater 4 is used are satisfied, the electromagnetic coil 41 of the viscous clutch 7 is turned on, and the rotational driving force of the engine E is transmitted to the viscous heater 4 through the V-belt 6 and the viscous clutch 7. In this way, by operating the viscous heater 4, the cooling water which circulates through the cooling water passage 51 of the viscous heater 4 while absorbing the heat generated by the high-viscosity fluid is supplied to the heater core 15.

Accordingly, the temperature of the cooling water flowing into the heater core 15 increases so that the temperature of the cooling water in the cooling water circuit 5 can be maintained approximately at a predetermined cooling water temperature (e.g., 80° C.). Therefore, a radiating amount of heat of the front heater core 15 increases, and heated sufficiently while passing through the heater core 15 can be blown into the passenger compartment, so that the heating capacity for the passenger compartment can be prevented from being deteriorated.

A second embodiment of the present invention will be described.

Figure 10:
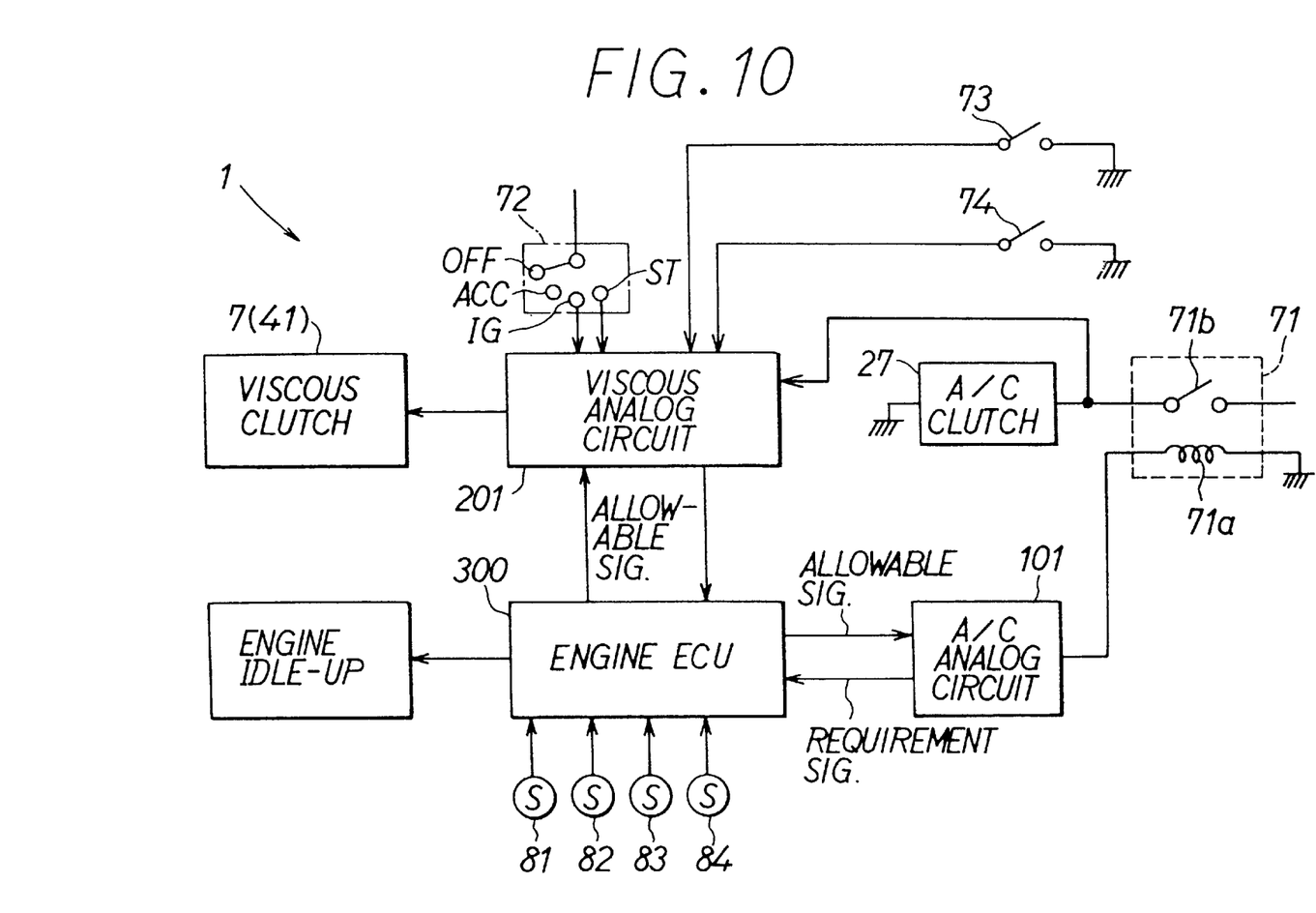
FIG. 10 is a block diagram showing an electric circuit of the air-conditioning apparatus for a vehicle, according to a second embodiment of the present invention.

FIG. 10 shows a second embodiment of the present invention and is a view showing an electric circuit of the air conditioning apparatus for a vehicle.

In this embodiment, a manual air conditioning system is employed as the air conditioning apparatus. In the electric circuit of the air conditioning apparatus 1 for a vehicle, instead of the viscous ECU 200, there are provided an air-conditioning analog circuit 101 (hereinafter referred to as "A/C analog circuit") for performing an analog control on the A/C unit 2 and a viscous analog circuit (heating control means) 201 for performing an analog control on the viscous clutch 7.

To an input portion of the A/C analog circuit 101, there are connected the E/G ECU 300, various kinds of sensors, and the like. To an output portion of the A/C analog circuit 101, there are connected the blower 22, the air-mixing damper 28, the relay coil 71a of the air-conditioning clutch relay 71, and the E/G ECU 300.

To an input portion of the viscous analog circuit 201, there are connected a connection between the relay switch 71b of the air-conditioning clutch relay 71 and the A/C clutch 27, a ST terminal and an IG terminal of the ignition switch 71, a viscous switch 73, a cooling water temperature switch 74, and the E/G ECU 300. To an output portion of the viscous analog circuit 201, there are connected the E/G ECU 300 and the electromagnetic coil 41 of the viscous clutch 7.

The cooling water temperature switch 74 is opened when the temperature of the cooling water circulating in the cooling water circuit 5 (in this embodiment, the temperature of the cooling water at the outlet-side cooling water pipe 57b of the cooling water passage 51 of the viscous heater 4) is higher than a predetermined temperature A (e.g., 80° C.) and is closed when the temperature of the cooling water is lower than the predetermined temperature A or another predetermined temperature B (e.g., 70–75° C.).

Further, when receiving an ON signal transmitted in a case where the viscous analog circuit 201 determines that the viscous clutch 7 is set on, the E/G ECU 300 performs a calculation or determination based on the rotational speed of the engine E, the vehicle speed, the throttle opening degree, or the cooling water temperature, and outputs to the viscous analog circuit 201 an allowable signal or unallowable signal for allowing or not allowing the A/C unit 2 or the viscous heater 4 to be turned on.

In this embodiment, even if the cooling water temperature switch 74 is set on (closed), at a time when the electromagnetic coil of the A/C clutch 27 of the compressor 31 is turned on (closed), the electromagnetic coil 41 of the viscous clutch 7 is turned off by the viscous analog circuit 201. In this way, the effects similar to those in the first embodiment can be obtained.

In each of the above-described embodiments, the V-belt 6 and the viscous clutch 7 are connected to and driven by the crankshaft 11 of the engine E to drive the shaft 8 of the viscous heater 4; however, the viscous clutch 7 may be connected directly to the crankshaft 11 of the engine E to drive the shaft 8 of the viscous heater 4. Further, between the crankshaft 11 of the engine E and the viscous clutch 7 or between the viscous clutch 7 and the shaft 8 of the viscous heater 4, there may be connected a transmitting mechanism (driving force transmitting means) such as a gear transmission having at least one stage gear and a V-belt type non-stage transmission.

In each of the above-described embodiments, the V-belt 6 of the belt transmitting mechanism 3 is hung on both of the A/C clutch 27 and the viscous clutch 7; however, the V-belt 6 of the belt transmitting mechanism 3 may be hung on an auxiliary equipment for an engine, such as a blower apparatus for blowing cool air toward a radiator, a hydraulic pump for a power steering system, a hydraulic pump for supplying hydraulic fluid to an automatic transmission, a hydraulic pump for supplying lubricating oil to the engine E or the transmission, or an alternator for charging a battery mounted on a vehicle, with the viscous clutch 7. Further, instead of the V-belt 6, a plurality of transmitting means such as a chain may be employed.

In each of the above-described embodiments, a water-cooled diesel engine is employed as the engine E; however, the other water-cooled internal combustion engines (water-cooled engine) such as a gasoline engine may be employed. Further, the compressor 31 and the viscous heater 4 may be actuated by using the other driving source such as a water-cooled engine which is not used for a heat source apparatus for heating operation, an air-cooled engine, an electric motor, a hydraulic pressure motor, and the like as the driving source.

In each of the above-described embodiments, the present invention is applied to an air conditioning apparatus for a vehicle, capable of performing a heating operation and a cooling operation for the passenger compartment; however, the present invention may be applied to an air-conditioning apparatus for a vehicle, capable of performing only a heating operation for the passenger compartment.

In each of the above-described embodiments, the cooling water temperature sensor 84 is employed to detect a temperature of the cooling water at the outlet-side cooling water pipe 57b of the cooling water passage 51 of the viscous heater 4; however, there may be employed a cooling water temperature sensor or a cooling water temperature switch for detecting a temperature of the cooling water at an inlet-side of the heater core 15 or the rear heater core 16. Further, there may be employed a cooling water temperature sensor or a cooling water temperature switch for detecting a temperature of the cooling water at an outlet-side of the engine E.

In each of the above-described embodiments, as the rotation determining means, whether or not the compressor 31 is operating is determined by closing the relay switch 71b of the air-conditioning clutch relay 71; however, whether or not the compressor 31 is operating may be determined by a refrigerant pressure or a refrigerant temperature of the refrigeration cycle 23, an input signal from an air-conditioning switch, a defroster mode switching switch, or the like.

In the above-described first embodiment, the following control may be performed. For example, when the A/C ECU 100 judges that the A/C clutch 27 of the compressor 31 is switched from OFF to ON by a signal from a post-evaporator temperature sensor or an ON signal from an air-conditioning switch, an allowable signal for allowing the A/C clutch 27 of the compressor 31 to be turned on is transmitted from the A/C ECU 100 to the viscous ECU 200 through the E/G ECU 300. At this time, the A/C ECU 100 turns on the A/C clutch 27 of the compressor 31 since a predetermined time (0.5 sec) has elapsed after the viscous clutch 7 is turned off by the viscous ECU 200. According to this control, it is possible to certainly avoid a state where both of the compressor 31 and the viscous heater 4 are simultaneously operating.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. A heating apparatus for a vehicle having a driving source and a passenger compartment, comprising:

a duct having an air outlet for blowing air toward said passenger compartment;

a refrigerant evaporator for cooling air flowing in said duct by heat-exchanging between the air and a refrigerant;

a refrigerant compressor having a rotating body which rotates when a rotational driving force of said driving source is applied thereto, said refrigerant compressor compressing the refrigerant sucked from said refrigerant evaporator when a rotational driving force is applied thereto;

a heating heat exchanger for heating air flowing in said duct by heat-exchanging between a thermal medium having been heated and the air;

a heat-generating unit using a shearing force, said heat-generating unit having a rotor which rotates when a rotational driving force of said driving source is applied thereto, a heat-generating chamber for sealing therein viscous fluid which generates heat when a shearing force generated by a rotational driving force of said rotor is applied thereto, said heat-generating unit heating the thermal medium to be supplied to said heating heat exchanger by said generated heat of the viscous fluid in said heat-generating chamber;

a driving force transmitting unit for transmitting a rotational driving force of said driving source to said rotor of said heat-generating unit and said rotating body of said compressor; and heating control means for controlling said driving force transmitting unit to stop said rotor of said heat-generating unit when said driving force transmitting unit is controlled to rotate said rotating body of said refrigerant compressor by said driving source.

2. A heating apparatus according to claim 1, wherein, said heating control means includes rotation determining means for determining whether or not said rotating body of said refrigerant compressor is rotating, and when said rotation determining means determines that said rotating body of said refrigerant compressor is rotating, said heating control means controls said driving force transmitting unit to stop said rotor of said heat-generating unit.

3. A heating apparatus according to claim 1, wherein said driving source is an internal combustion engine mounted on said vehicle.

4. A heating apparatus according to claim 3, wherein, said driving force transmitting unit includes:

first clutch means for intermitting a transmission of the rotational driving force from said internal combustion engine to said rotating body of said refrigerant compressor;

second clutch means for intermitting a transmission of the rotational driving force from said internal combustion engine to said rotor of said heat-generating unit; and belt transmitting means for transmitting the rotational driving force from said internal combustion engine to said first clutch means and said second clutch means.

5. A heating apparatus according to claim 4, wherein each of said first clutch means and said second clutch means includes an electromagnetic coil which is electrically controlled by said heating control means..

6. A heating apparatus according to claim 4, further comprising:

a heating preference switch for giving a priority on a heating operation; wherein, when said heating preference switch is set off, said second clutch means stops the transmission of the rotational driving force from said internal combustion engine to said rotor of said heat-generating unit.

7. A heating apparatus according to claim 1, wherein said thermal medium is cooling water for cooling said driving source.

8. A heating apparatus according to claim 7, further comprising:

a cooling water temperature switch which is closed when a temperature of the cooling water is lower than a predetermined temperature; wherein, when said cooling water temperature switch is opened, said second clutch means stops the transmission of the rotational driving force from said internal combustion engine to said rotor of said heat-generating unit.

9. A heating apparatus for a vehicle having a driving source and a passenger compartment, comprising:

a duct having an air outlet for blowing air toward said passenger compartment;

a refrigerant evaporator for cooling air flowing in said duct by heat-exchanging between the air and a refrigerant;

a refrigerant compressor having a rotating body which rotates when a rotational driving force of said driving source is applied thereto, said refrigerant compressor compressing the refrigerant sucked from said refrigerant evaporator when a rotational driving force is applied thereto;

a heating heat exchanger for heating air flowing in said duct by heat-exchanging between a thermal medium having been heated and the air;

a heat-generating unit using a shearing force, said heat-generating unit having a rotor which rotates when a rotational driving force of said driving source is applied thereto, a heat-generating chamber for sealing therein viscous fluid which generates heat when a shearing force generated by a rotational driving force of said rotor is applied thereto, said heat-generating unit heating the thermal medium to be supplied to said heating heat exchanger by generated heat of the viscous fluid in said heat-generating chamber; and a driving force transmitting unit for transmitting a rotational driving force of said driving source to said rotor of said heat-generating unit and said rotating body of said compressor;

wherein said driving force transmitting unit is controlled such that a shearing operation of the viscous fluid by the rotational driving force of said rotor of said heat-generating unit is stopped when said rotating body of said refrigerant compressor is rotated by said driving source.

10. A heating apparatus according to claim 1, wherein said refrigerant compressor is preferentially operated relative to said heat-generating unit so that said rotational driving force from said driving source is controlled to be lower than a predetermined value.

11. A heating apparatus for a vehicle having a driving source and a passenger compartment, said heating apparatus comprising:

a duct for blowing air toward said passenger compartment;

a cooling system for cooling air flowing in said duct, said cooling system including an evaporator and a compressor;

a heating system for heating air flowing in said duct, said heating system including a heat exchanger and a heat-generating unit;

a driving force transmitting unit for transmitting a driving force to said compressor of said cooling system and to said heat-generating unit of said heating system; and means for controlling said driving force transmitting unit such that only one of said compressor and said heat-generating unit are being driven.

12. The heating apparatus according to claim 11, wherein said controlling means gives preference to said compressor.

* * * * *